C. J. GLASEL.

AUTOMATIC TANNING MACHINE.

APPLICATION FILED MAR. 6, 1905.

Reissued May 17, 1910.

13,116.

3 SHEETS—SHEET 1.

Witnesses:
Rollin Abell
Carolyn C. Stecher.

Inventor:
Charles John Glasel
by
Albright Brown & Dunlap
his Attys

NORRIS PETERS, INC. LITHO., WASHINGTON, D. C.

C. J. GLASEL.

AUTOMATIC TANNING MACHINE.

APPLICATION FILED MAR. 6, 1905.

Reissued May 17, 1910.

13,116.

3 SHEETS—SHEET 2.

Witnesses:
Rollin Abell
Carolyn C. Stecher

Inventor:
Charles John Glasel
by Wright Brown & Quinby
his Attys

NORRIS PETERS, INC., LITHO., WASHINGTON, D. C.

C. J. GLASEL.
AUTOMATIC TANNING MACHINE.
APPLICATION FILED MAR. 6, 1905.
Reissued May 17, 1910.
13,116.
3 SHEETS—SHEET 3.
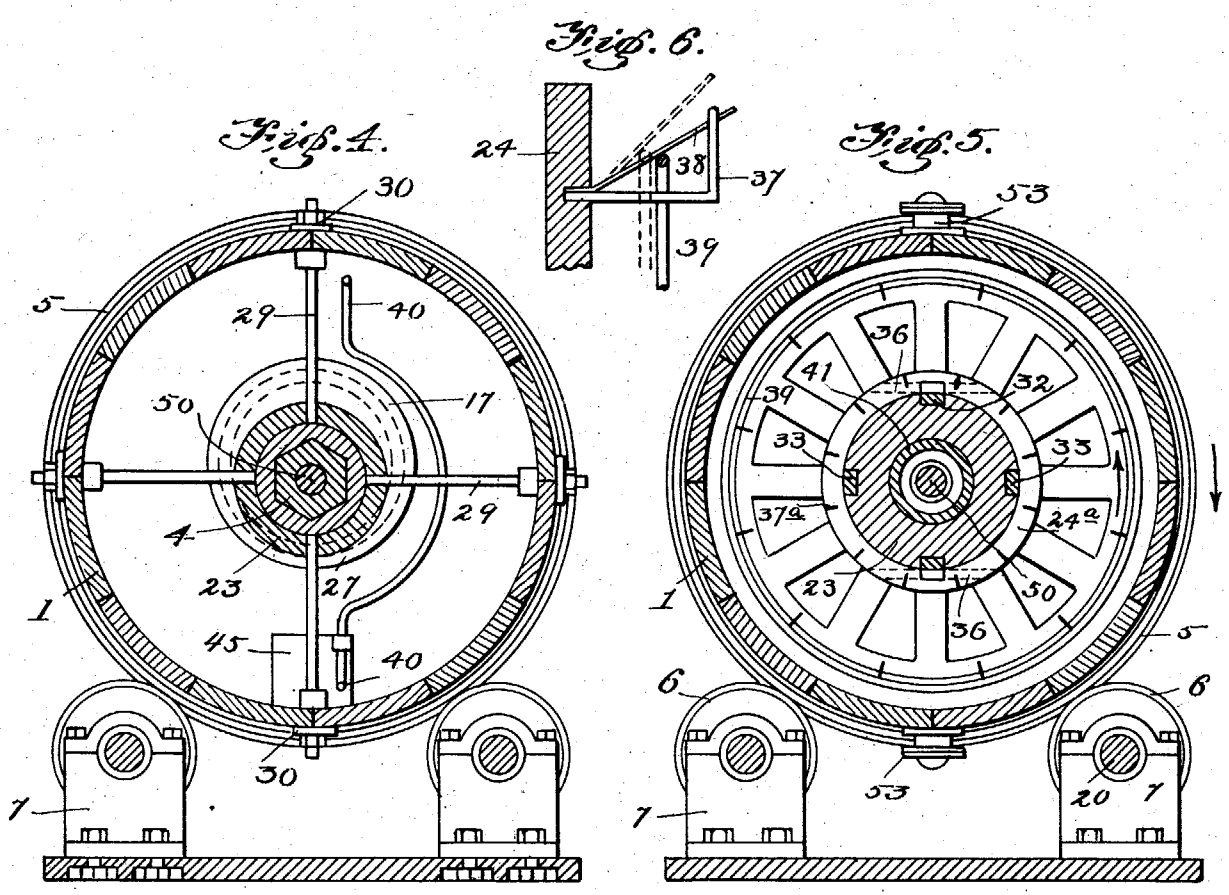
Witnesses:
Rollin Abell.
Carolyn C. Stecher.
Inventor:
Charles John Glasel
by
Wright & Brown & Quinby
his Attys
NORRIS PETERS, INC., LITHO., WASHINGTON, D. C.

UNITED STATES PATENT OFFICE.

CHARLES JOHN GLASEL, OF BOSTON, MASSACHUSETTS.

AUTOMATIC TANNING-MACHINE.

13,116. Specification of Reissued Letters Patent. Reissued May 17, 1910.

Original No. 782,193, dated February 7, 1905, Serial No. 175,694. Application for reissue filed March 6, 1905. Serial No. 248,777.

*To all whom it may concern:*

Be it known that I, CHARLES JOHN GLASEL a citizen of the United States, residing a Boston, in the county of Suffolk and State o Massachusetts, have invented certain new and useful Improvements in Automatic Tanning-Machines; and I do hereby declare the following to be a full, clear, and exact description of the invention, such as will enable others skilled in the art to which it appertains to make and use the same.

My invention relates to automatic tanning machines, and has for its object the novel construction and arrangement of its parts, whereby the hides or skins may be quickly secured to removable frames which are adapted to be placed in the cylinder and rotated therein with the hides while the latter are subjected to the spray of certain liquids used in depilatory tanning and coloring leather. These and other objects of this invention are described in detail in the following specification and more clearly pointed out in the appended claims.

Figure 1:
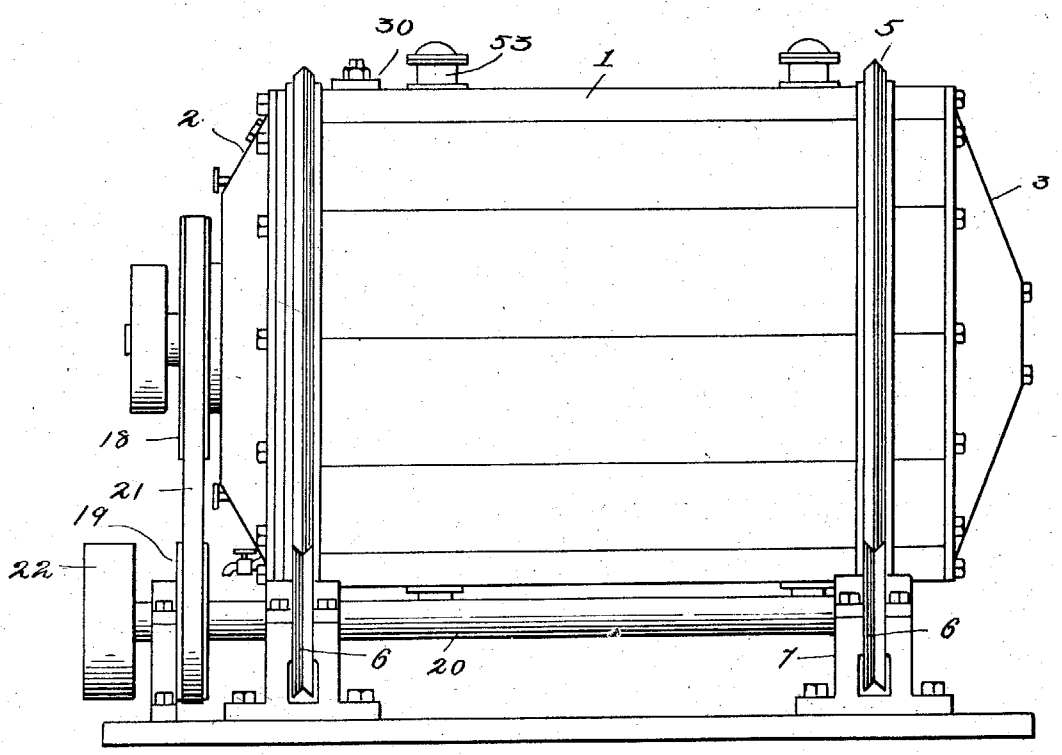
Figure 3:
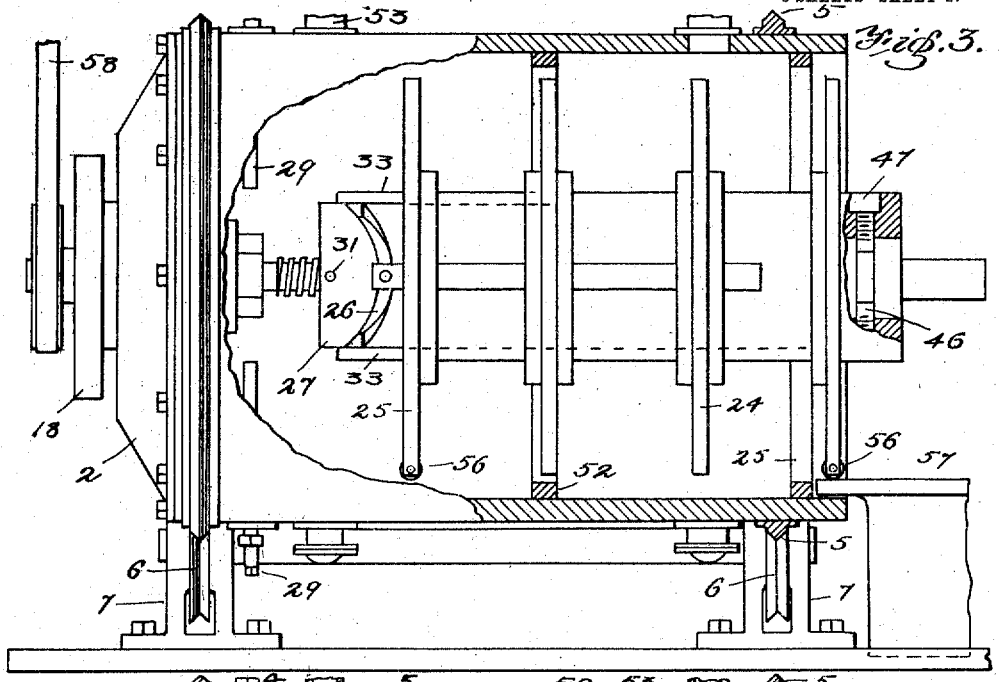
Figure 2:
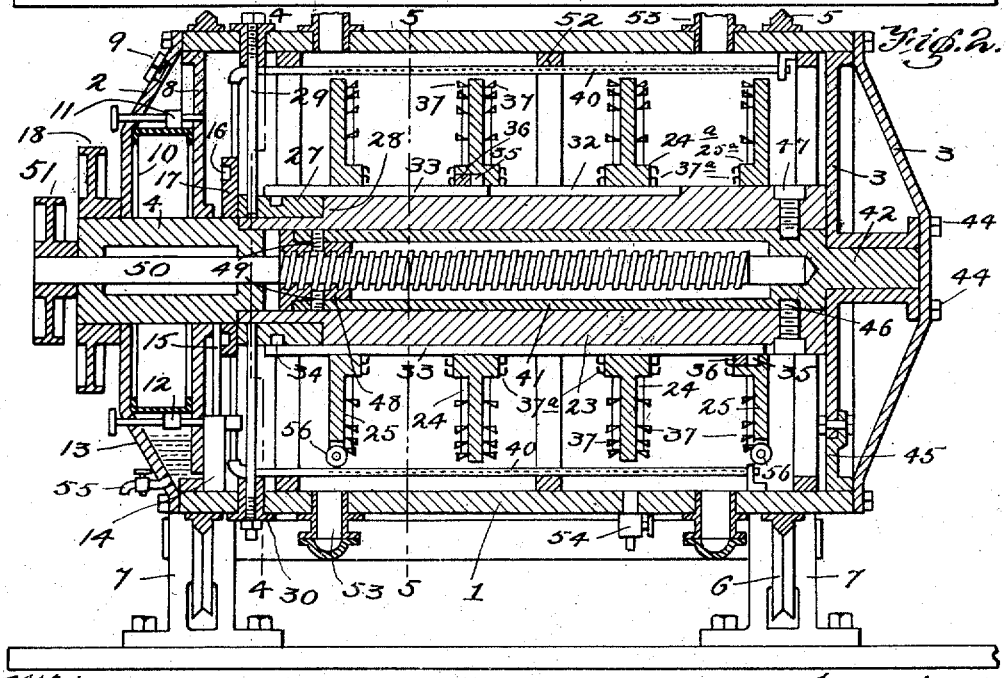

In the drawings forming a part of this specification, and in which like reference characters refer to the same parts in the various figures,—Figure 1 is a side elevation of my improved automatic tanning-machine. Fig. 2 is a longitudinal vertical section of the same automatic tanning-machine. Fig. 3 is a side elevation with part of the casing broken away to show the interior arrangement of the parts when the frames carrying the hides are being removed from or returned to the cylinder. Fig. 4 is a transverse section on line 4 4 of Fig. 2. Fig. 5 is a transverse section on the line 5 5 of Fig. 2. Fig. 6 is a detail view of one of the hooks which secure the hides to the frames.

My improvements are embraced in a cylinder 1, preferably made of some non-ferruginous material and having heads 2 and 3, the head 2 having an opening which contains a sleeve 4, while the head 3 is solid. The cylinder near each end is provided with annular rails 5, which travel in grooved rollers 6, suitably carried in bearings 7 and supporting the cylinder and permitting its rotation in either direction. As shown in Fig. 4, these bearings may at one end of the cylinder be adjusted longitudinally with relation thereto in order to secure the perfect movement of the rail in the rollers.

Within the cylinder and adjacent to the head 2 is a partition 8, secured to the cylinder and having an opening for the reception of the sleeve 4. In the space formed by the partition and the head is carried the liquid for treating the hides, and it is admitted through an opening closed by the plug 9 and into a centrally-disposed tank 10 through the valve 11 and out of the tank 10 through valve 12 into a space 13, which communicates with a pump 14, whose suction-rod 15 is actuated by the eccentric groove 16 of the disk 17.

The outer end of the sleeve 4 carries a pulley 18, which is driven by the pulley 19 on the driving-shaft 20 through the medium of the belt 21. The shaft 20 carries two of the rollers 6 at one side of the apparatus and is also provided with a pulley 22, through which it receives its motion. To the inner end of the sleeve 4 is secured a second hollow shaft 23, carrying a series of circular perforated frames 24 and 25, the latter being secured to the shaft, while the former are loosely disposed thereon and adapted to move in directions as shown. The movement of the frames 24 is effected by means of the cam-groove 26 in the outer surface of the sleeve 27, secured between the shoulder 28 of the shaft 23 and the disk 17 and rigidly connected with the cylinder by means of radial rods 29, which are adjustable in the bearings 30, carried by the cylinder, and enter perforations 31 in the sleeve 27. The shaft 23 has longitudinal grooves 32, in which play rods 33, carrying at one end lugs or rollers 34, which play in the groove 26, and have at the other end lugs 35, by which the rods are locked to the sliding frames by means of tangential keys 36, as shown in Figs. 2 and 5.

Near the outer edge of the frames 24 and 25 and on the faces which coöperate are arranged hooks 37, (shown more clearly in Fig. 6,) each hook having a perforated spring-lock or snap 38, which is adapted to close down upon it after the hide has been attached. These snaps on each frame are all simultaneously disengaged from their respective hooks by a hoop or ring 39, which when forced back toward the frame causes an upward and backward movement of the spring away from the hook. Around the hubs 24ª and 25ª are also secured hooks 37ª, which are adapted to coöperate with the outer hooks and hold the hides in place within the opposite faces of each set of frames and while they are being treated.

In Figs. 2 and 4 will be seen several perforated pipes 40, which are carried through the cylinder and are connected with the outlet of the force-pump 14. While but two of these pipes are shown, it is obvious that I may employ a greater number of them. Likewise I may vary the size and number of perforations as the occasion may demand.

Within the shaft 23 is carried a second hollow shaft 41, whose outer reduced end 42 is supported in bearings in a partition 43 within the end of the cylinder closed by the head 3, and the apparatus is strengthened by the bolts 44, which pass through the head and into the bearing. At one point of the edge of this partition is an opening having a door 45 for the removal of sediment, &c. Near the outer end of the shaft 41 is a circumferential groove 46, in which play the ends of adjustable pins 47, carried by the shaft 23, and while permitting the two shafts to rotate independently cause the shaft 23 to move longitudinally with the shaft 41 at certain times. The inner end of the opening in the shaft 41 carries a nut 48, secured to it by means of screws or pins 49, and through this nut plays a screw 50, one end being journaled in the shaft 41, while the other end is carried by the shaft 4 and on the outside thereof provided with a pulley 51.

The cylinder may be provided with interior bracing-rings 52 and at certain points with receptacles 53 for certain ingredients which may be useful in the tanning or coloring of the hides. Outlets 54 and 55 are also provided to drain the cylinder and the space formed by the head 2 when it is so desired, and the frames 25 are provided with rollers 56, the object of which will be explained later.

The operation of the machine is as follows: The hides to be treated are stretched on the hooks 37 and 37[a] between a stationary and a moving frame or on lines radiating from the center of the cylinder, and when the power is applied to the rollers which drive the cylinder and rotate same the pulley 18 is rotated in the opposite direction, carrying with it the shafts 4 and 23 and the hide-carrying frames 24 and 25. As the hides pass the perforated pipes they are subjected to a forced spray from the liquid in the space 13, and those remaining in the bottom of the cylinder by means of the pump 14, which is carried by the cylinder proper, while the operating-disk 17 is rotated by the pulley 18. The sleeve 27 is controlled by the movement of the cylinder, while the shaft 23, carrying the rods 33, travels in a reverse direction, and the groove 26 causes the rods to reciprocate, moving the frames 24 to and fro with relation to the frames 25 and stretching the hides and then allowing the same to contract, thus opening and closing the pores of the skins as the solution is sprayed upon them and causing the hides to absorb the solution and become permeated rapidly and economically. When this treatment has been concluded and it is desired to remove the treated hides and renew the operation with fresh ones, the head 3 is removed and the partition 43 taken out. This leaves the shafts 23 and 41 unsupported at this end of the apparatus until a track 57, Fig. 3, is put into position beneath the roller 56 of the outer frame 25, the rods 29 are withdrawn from the openings 31, and a belt 58 is then placed on the pulley 51, so as to rotate the screw 50 and cause the nut 48 to work outward along its length, carrying with it the shaft 23 and the frames 24 and 25. When these parts are so propelled to the outside of the cylinder, the treated hides are removed and the frames are replenished with skins for treatment and carried back into the cylinder and the head 3 secured in its place.

It is evident that the pipes 40 may be used to supply the cylinder with certain gases or fumes, if so desired, and various modified forms of details may be resorted to to accomplish the ends sought. The stationary frames 25 may also slide loosely on the shaft 23 and be provided with actuating-rods, and the lugs connecting these rods with the frames may be adjustable along the length of the rod, so that the frames may be adjusted to any degree of proximity to provide for hides of different kinds and sizes.

When the shafts and frames are removed with the treated hides, a similar set of shafts and frames with hides to be treated may be prepared and put into position and carried into the cylinder by the reverse action of the screw 50 and the new set of hides be put through the above-described treatment while the treated hides which have been removed are being taken from the frames and the latter replenished. The screw and mechanism for expelling the shaft may be reversed and so connected with the shaft that it will be carried by it and work against the cylinder-head when operating.

Instead of a screw it is obvious that I may use any well-known mechanical means to remove and reinsert the shaft with the frames and hides without departing from the broad idea herein described and claimed.

Having thus described my invention, what I claim as new, and desire to secure by Letters Patent is—

1. The combination with a receptacle, of means for suspending hides therein at different points and on opposite sides of the hide, and mechanism for alternately straining and relaxing the texture of the hides on lines between said points.

2. In a machine of the character referred to, devices to which separate portions of each of the hides may be attached, means for actuating said devices to intermittently move said separate portions of each of the hides relatively to each other, and means whereby said hides are supplied with hide-treating material.

3. In a machine of the character referred to, means for suspending hides at different points on opposite sides, positive mechanism for alternately and intermittently straining the texture of the hides and permitting them to contract, and means in consequence of which said hides are supplied with proper treating material during the stretching and contracting operations.

4. In a machine as described, the combination with mechanism for alternately stretching the hides under tension and permitting them to relax, of means for supplying hide treating material to the hides.

5. In a machine of the character referred to, means for attaching hides at different points and on opposite sides, mechanism for alternately and intermittently stretching the hides and permitting them to contract, means whereby said hides are rotated about a common center, and means by which hide-treating material is supplied to said hides.

6. In a machine of the character referred to, a rotary receptacle for tanning material, means in said receptacle for arranging and holding a plurality of hides at different points on opposite sides and in a substantially flat condition with spaces between them for the passage of tanning material, and means for causing said hides to be moved relatively to said receptacle while held as described.

7. In a machine of the character referred to, a receptacle, means in said receptacle, for attaching a plurality of hides on opposite sides thereof with spaces between them for the passage of tanning material, and means for causing said hides to be intermittently and positively stretched and contracted while held as described.

8. In a hide-treating machine, the combination with a receptacle; means therein for attaching hides at a point or points on opposite sides thereof, means for alternately stretching the hides beyond the normal and permitting them to contract, and said hides being separated for the passage of a hide-treating material, and means for supplying said material to the hides.

9. In a machine of the character referred to, a receptacle, means in said receptacle for holding a plurality of hides with spaces between them for the passage of hide or leather treating material, and means whereby different portions of each hide are positively moved toward and from each other while held as described.

10. In a tanning machine, the combination of a cylinder, rotating frames carrying the hides, means for rotating the frames, and means for reciprocating the frames while rotating.

11. In a tanning-machine, the combination of a cylinder, rotating frames carrying the hides, means for rotating the frames and means afforded whereby adjacent and cooperating frames reciprocate independently.

12. In a tanning-machine, the combination of a cylinder, rotating frames carrying the hides, means for rotating the frames, and means for reciprocating the adjacent and cooperating frames in different directions.

13. In an automatic device for treating hides and skins, the combination of a rotating cylinder, means for rotating same, a shaft carried within the cylinder and adapted to rotate independently thereof, means for rotating the shaft independently of and in a direction reverse to the direction of the rotation of the cylinder, frames carried by the shaft and adapted to support the hides or skins and means for removing the shaft and frames from and to the cylinder.

14. In a tanning-machine, the combination of a cylinder, a rotating shaft, frames adapted to be adjusted on the shaft, cooperating frames adapted to slide on the shaft, means for rotating the shaft and means for reciprocating the movable frames.

15. In a tanning-machine, the combination of a rotating cylinder, means for rotating same, a shaft in the cylinder rotating independently of the cylinder, frames arranged in pairs on the shaft and adapted to carry the hides and vary their relations with each other, and means for varying the relations of each pair of frames.

16. In a tanning-machine, the combination of a cylinder, a shaft rotating in the same, means for rotating the shaft, frames carrying the hides, arranged in coöperating pairs on the rotating shaft and as such adapted to decrease or increase their distance apart on said shaft and means for varying the distance of separation.

17. In a tanning-machine, the combination of a rotating cylinder, a shaft rotating in the cylinder, means for rotating the cylinder, means for rotating the shaft independently of the cylinder, supporting-frames for the hides arranged in pairs on the shaft and adapted to vary their relation while rotating with the shaft and means for varying the relative distances of each pair of frames to enable hides and skins all possible movements.

18. In a tanning-machine, the combination of a rotating cylinder, means for rotating same, a shaft within the cylinder adapted to rotate in an opposite direction to the rotation of the cylinder, means for rotating the shaft, reciprocating frames carried by the shaft, means for reciprocating the frames, and means for expelling the shaft and its frames from the cylinder.

19. In a tanning-machine, the combination of a cylinder with annular rails, rollers carrying and rotating the cylinder, means for actuating the rollers, a shaft within the cylinder and adapted to rotate independently of the same, and in a contrary direction thereto, means for rotating the shaft, frames and hooks carried by the shaft and adapted to shift lengthwise of the shaft, means for shifting the frame while the shaft rotates, traction-rollers carried by one or more of the frames for supporting the frames and shaft when expelled from the cylinder and means for expelling the frames and shaft from the cylinder.

20. In a tanning-machine, the combination of a rotating cylinder, means for rotating same, a hollow shaft rotating independently of and within the cylinder, means for rotating the shaft, frames carried by the shaft and arranged in coöperating pairs, means for causing the frames of each pair to advance toward and recede from each other, a screw within the hollow shaft and means interposed between the screw and the shaft adapted to cause the rotation of the screw to expel the shaft from the cylinder but to permit of the independent rotation of the shaft.

21. In a tanning-machine, the combination of a rotating cylinder, means for rotating same, an independently-rotating hollow shaft within the cylinder, means for rotating the shaft, a second hollow shaft within the first and having one of its ends supported by the cylinder, a nut secured within the second shaft, a screw having one end supported by the cylinder and playing in the nut within the second shaft, a pulley on the screw and means for actuating the pulley.

22. In a tanning-machine, the combination of a rotating cylinder with heads, means for rotating the cylinder partitions within the cylinder, a sleeve carried by and adapted to rotate in one of the heads, means for rotating the sleeve, a hollow shaft carrying reciprocating frames, a sleeve with a cam-groove around its exterior, longitudinal rods carried by the shaft and having studs at each end to play in the groove and connect them with the frames respectively, and means connecting the sleeve with the cylinder to cause it to move therewith.

23. In a tanning-machine, the combination of a rotating cylinder, means for rotating same, a sleeve supported at one end of the cylinder, a hollow shaft within the cylinder and secured to the inner end of the sleeve, rotating means at the outer end of the sleeve, a sleeve loosely mounted on the hollow shaft and having a cam-face on its exterior, adjustable means securing said sleeve to the rotating cylinder, frames arranged in coöperating pairs on the shaft and adapted to reciprocate to and from each other, means actuated by the cam-face of the sleeve for producing this to-and-fro motion, and means for moving the frames independently of the shaft.

24. In a tanning-machine, the combination of a rotating cylinder, means for rotating same, hollow heads secured to the cylinder, a hollow shaft carrying reciprocating frames with hooks, means for reciprocating the frames, a sleeve rotating in one of the heads of the cylinder and carrying one end of the shaft, means for rotating the sleeve, a second hollow shaft within the first and having one of its ends journaled in the other head of the cylinder, a nut within the second shaft and secured thereto, an annular groove in the said shaft, adjustable pins carried by the first shaft and playing in the annular groove, a screw with its free end journaled in the sleeve and playing in the nut of the second shaft, and means for rotating the screw.

25. In a tanning-machine, the combination of a rotating cylinder, means for rotating same, hollow heads for the cylinder, a sleeve rotating independently in one of the heads, tanks in said head, valves or cocks controlling the inlet and outlet of the tank, an inlet in the head, an outlet in the head, a force-pump communicating with the interior of the hollow head, perforated pipes running through the cylinder and connected with the discharge of the pump and a cam carried by the rotating sleeve and actuating the suction-rod of the pump.

26. In a tanning-machine, the combination of a rotating cylinder, means for rotating same, an independently-rotating shaft with frames for the hides carried within the cylinder, means for rotating the shaft, a removable head on the cylinder and means carried by the cylinder for expelling the shaft and frames when the operation is completed and introducing the same with a new supply of skins or hides.

27. In a tanning-machine, the combination of a rotating cylinder, means for rotating same, an independently-rotating shaft operating within the cylinder and carrying frames to support the skins, means on the exterior of the cylinder for rotating the shaft, and means operated from the exterior for expelling the shaft with its frames and treated hides and re-introducing the shaft and frames with a supply to be treated.

28. The combination with a receptacle of holding means to which the hides are attached, means for actuating said holding means to move portions of the hide relatively to each other, and power mechanism for expelling said holding means from the receptacle.

29. In a machine of the character referred to, a receptacle, means to which separated portions of each of the hides may be attached, devices whereby said hides may be intermittently stretched while located in said receptacle, and mechanism for moving said means out of said receptacle.

30. In a machine of the character referred to, a receptacle, automatic mechanism in said receptacle for positively straining the texture of the hides arbitrarily and mechanically and permitting them to contract, and means for moving said automatic mechanism out from said receptacle.

31. In a machine of the character referred to, a receptacle, means in said receptacle for securing and maintaining a plurality of hides substantially radially about a common center, means by which said hides are alternately, intermittently and positively stretched, means by which said hides are rotated about said center, and power-mechanism for moving said securing means out of said receptacle.

32. In a machine of the character referred to, a closed receptacle having a removable part, means located within said receptacle for holding each hide at separated portions thereof with said hides substantially separated from each other, means by which said hides are intermittently and positively stretched, and means for expelling said holding means and said sides through the opening made by removing said part of the receptacle.

33. In a machine of the character referred to, a cylinder, rotatable shaft, means for rotating the shaft, means supported by said shaft for holding the hides, a removable head on the cylinder, and means for expelling said shaft and said holding means from said cylinder.

34. In a machine of the character referred to, a closed receptacle, a hide-carrying and moving means in said receptacle, and a screw and nut located within said receptacle and operatively connected to said hide-carrying means to expel it from said receptacle.

35. In a machine of the character referred to, a closed receptacle having a removable portion, a hide-carrying and moving means in said receptacle, and a screw and nut located within said receptacle and operatively connected to said hide-carrying means to expel it from said receptacle, and means exterior to said receptacle for actuating said screw.

36. In a machine of the character referred to, a receptacle, rotatable hide carriers, means for suspending the hides at opposite sides thereof, devices for spraying hides, and a pump in said receptacle for supplying hide-treating material, to said spraying devices.

37. In a machine of the character referred to, a receptacle, rotatable hide carriers in said receptacle, means for suspending the hides at opposite sides thereof, a pump or other device in said receptacle, spraying devices in said receptacle to which hide-treating material is delivered by said pump or device, and means for actuating said pump or device.

38. The combination with a receptacle, of holding devices to which hides are attached, means for actuating said devices to move portions of the hide relatively to other portions thereof, and power mechanism for introducing said devices into said receptacle and for expelling the same therefrom.

In testimony whereof, I have signed my name to this specification, in the presence of two subscribing witnesses.

CHARLES JOHN GLASEL.

Witnesses:
MARCUS B. MAY,
CAROLYN C. STECHER.